United States Patent
Obara (10) Patent No.: US 11,801,856 B2
(45) Date of Patent: Oct. 31, 2023

(54) ELECTRONIC CONTROL DEVICE AND SELECTION METHOD

(71) Applicant: Hitachi Astemo, Ltd., Hitachinaka (JP)

(72) Inventor: Kiyohiro Obara, Tokyo (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 0 days.

(21) Appl. No.: 17/795,103

(22) PCT Filed: Dec. 25, 2020

(86) PCT No.: PCT/JP2020/049045
§ 371 (c)(1),
(2) Date: Jul. 25, 2022

(87) PCT Pub. No.: WO2021/153140
PCT Pub. Date: Aug. 5, 2021

(65) Prior Publication Data
US 2023/0066245 A1   Mar. 2, 2023

(30) Foreign Application Priority Data
Jan. 27, 2020   (JP) .................................. 2020-011230

(51) Int. Cl.
*B60W 50/14*   (2020.01)
*B60W 50/08*   (2020.01)

(52) U.S. Cl.
CPC .......... *B60W 50/14* (2013.01); *B60W 50/085* (2013.01); *B60W 2556/10* (2020.02)

(58) Field of Classification Search
CPC . B60W 50/14; B60W 50/085; B60W 2556/10
See application file for complete search history.

(56) References Cited

U.S. PATENT DOCUMENTS

2014/0309841 A1   10/2014   Hara et al.

FOREIGN PATENT DOCUMENTS

| JP | H11-20505 A | 1/1991 | |
| JP | 2016216021 A | * 12/2016 | ............. B60K 31/00 |

(Continued)

OTHER PUBLICATIONS

International Search Report, PCT/JP2020/049045, dated Mar. 16, 2021, 2 pgs.

*Primary Examiner* — Nabil H Syed
*Assistant Examiner* — Cal J Eustaquio
(74) *Attorney, Agent, or Firm* — Volpe Koenig (57) ABSTRACT

An electronic control device is mounted on a vehicle having a sensor, and includes: a storage unit that stores a control history in which a vehicle control condition and an actual number of measurement times of the vehicle control condition are associated with each other, the vehicle control condition being a condition for performing an arbitrary vehicle control operation for each position; a position specifying unit that specifies a position of the vehicle; a determination unit that determines a current sensor capability that is a current capability of the sensor; and a selection unit that selects, from the storage unit, the vehicle control condition having the largest actual number among the vehicle control conditions that have a position within a predetermined distance from the position specified by the position specifying unit and that can be determined by the current sensor capability.

7 Claims, 7 Drawing Sheets

(56) References Cited

FOREIGN PATENT DOCUMENTS

| | | |
|---|---|---|
| JP | 2019-144758 A | 8/2019 |
| JP | 2019-174304 A | 10/2019 |
| WO | 2013/076829 A1 | 5/2013 |

* cited by examiner

| POSITION (LATITUDE, LONGITUDE) | OPTION | CONTROL CONDITION | | NUMBER OF MEASUREMENT TIMES |
| --- | --- | --- | --- | --- |
| | | RELATIVE DISTANCE | RELATIVE SPEED | |
| (x1, y1) | OVERTAKEN AND MERGE | 10m OR LESS | 10km/h OR LESS | 5 |
| | | 10m OR LESS | 10 TO 20km/h | 4 |
| | | 10m OR LESS | 20km/h OR MORE | 9 |
| | | 10 TO 15m | 10km/h OR LESS | 12 |
| | | . | . | . |
| | | . | . | . |
| | OVERTAKE AND MERGE | 10m OR LESS | 10km/h OR LESS | 8 |
| | | 10m OR LESS | 10 TO 20km/h | 12 |
| | | 10m OR LESS | 20km/h OR MORE | 12 |
| | | 10 TO 15m | 10km/h OR LESS | 13 |
| | | . | . | . |
| | | . | . | . |
| (x2, y2) | . | 10m OR LESS | 10km/h OR LESS | 5 |
| | . | .. | .. | .. |

ELECTRONIC CONTROL DEVICE AND SELECTION METHOD

TECHNICAL FIELD

The present invention relates to an electronic control device and a selection method.

BACKGROUND ART

Information collection by sensors is essential for safe and secure traveling of vehicles. Sensing capability of a sensor is deteriorated due to various factors. PTL 1 discloses a vehicle control device that selects one control pattern suitable for a traveling state or a traveling environment from among a plurality of control pattern candidates and controls a vehicle, the vehicle control device including: a plurality of detection units that detect the traveling state or the traveling environment; an evaluation value generation unit including a reference evaluation value storage unit that stores a reference evaluation value obtained by quantifying weighting of each output for each of the plurality of control pattern candidates and outputs of the plurality of detection units, a detection state detecting unit that detects a detection state of the detection unit, and an evaluation value setting unit that sets an evaluation value in accordance with a detection result of the detection state detecting unit on the basis of the reference evaluation value; a control pattern selecting unit that selects the one control pattern from among the plurality of control pattern candidates in accordance with the evaluation value and detection results of the plurality of detection units; and a vehicle control unit that controls a vehicle in accordance with the selected control pattern.

CITATION LIST

Patent Literature

PTL 1: JP H11-020505 A

SUMMARY OF INVENTION

Technical Problem

The invention described in Patent Literature 1 does not sufficiently cope with a decrease in performance of a sensor.

Solution to Problem

An electronic control device according to a first aspect of the present invention is an electronic control device mounted on a vehicle having a sensor, the electronic control device including: a storage unit that stores a control history in which a vehicle control condition and an actual number of measurement times of the vehicle control condition are associated with each other, the vehicle control condition being a condition for performing an arbitrary vehicle control operation for each position; a position specifying unit that specifies a position of the vehicle; a determination unit that determines a current sensor capability that is a current capability of the sensor; and a selection unit that selects, from the storage unit, the vehicle control condition having the largest actual number among vehicle control conditions that have a position within a predetermined distance from the position specified by the position specifying unit and that can be determined by the current sensor capability.

A selection method according to a second aspect of the present invention is a selection method executed by an electronic control device mounted on a vehicle having a sensor, the electronic control device including a storage unit that stores a control history in which a vehicle control condition and a number of measurement times of the vehicle control condition are associated with each other, the vehicle control condition being a condition for performing an arbitrary vehicle control operation for each position, the selection method comprising: specifying a position of the vehicle; determining a current sensor capability that is a current capability of the sensor; and selecting, from the storage unit, the vehicle control condition having the largest number of measurement times among the vehicle control conditions that have a position within a predetermined distance from the specified position and can be determined by the current sensor capability.

Advantageous Effects of Invention

According to the present invention, it is possible to select a control condition included in a measurable range of a sensor to be used.

DESCRIPTION OF EMBODIMENTS

First Embodiment

Hereinafter, a first embodiment of an electronic control device will be described with reference to FIGS. 1 to 4.

Figure 1:
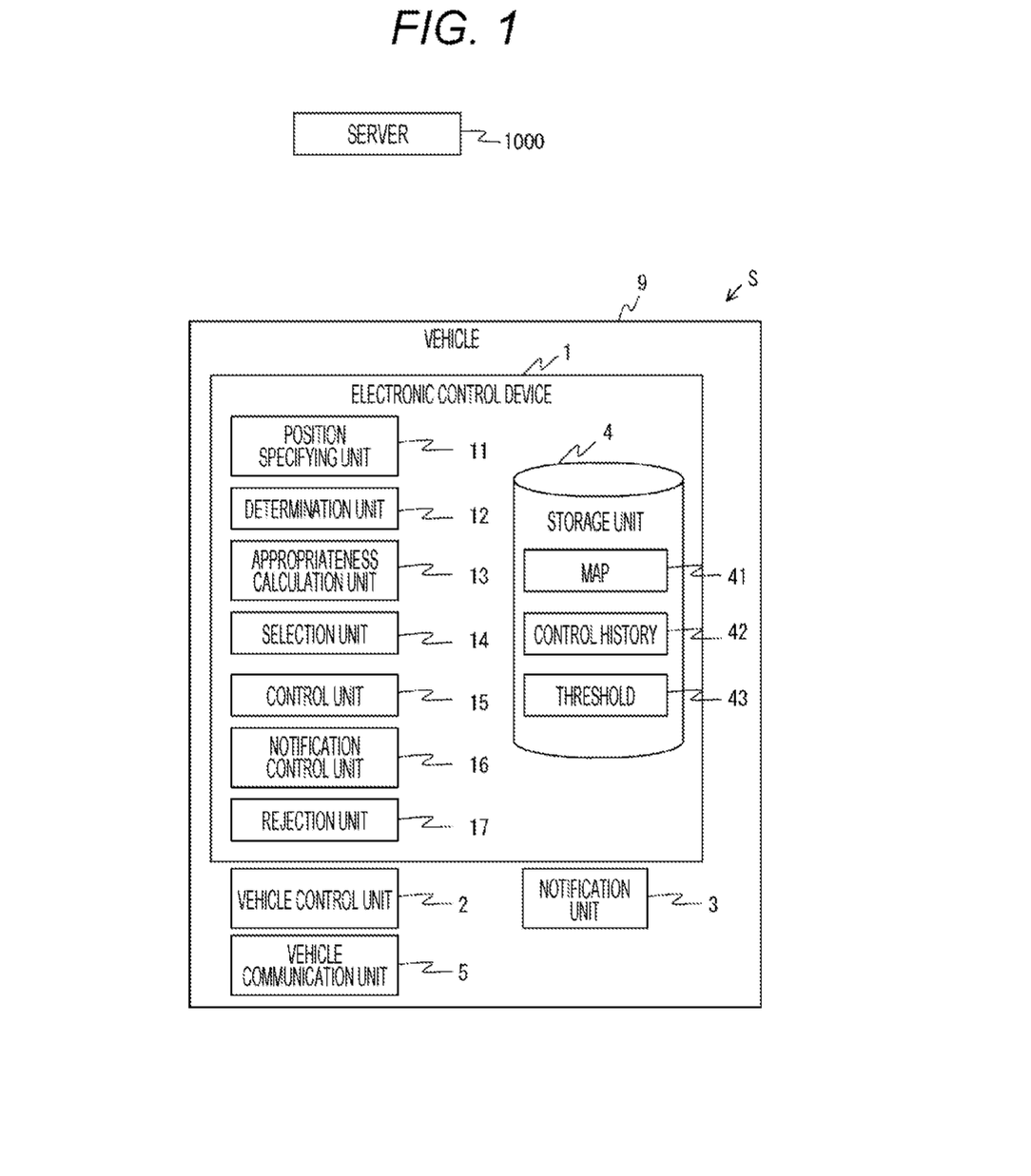
FIG. 1 is a configuration diagram of an electronic control device and a vehicle on which the electronic control device is mounted according to a first embodiment.

FIG. 1 is a configuration diagram of an electronic control device 1 according to the first embodiment and a vehicle 9 on which the electronic control device 1 is mounted. Note that, hereinafter, the vehicle 9 is also referred to as a host vehicle 9, and a human in the vehicle 9 is referred to as a "user". The vehicle 9 includes an electronic control device 1, a vehicle control unit 2, a notification unit 3, and a vehicle communication unit 5.

The vehicle control unit 2 controls at least one of a power device, a braking device, and a steering device included in the vehicle 9 on the basis of a command of the control unit 15 to be described later. The power device is, for example, an engine or a motor. The braking device is, for example, a brake. The notification unit 3 is a speaker or a liquid crystal display. The notification unit 3 operates in accordance with a command of a notification control unit 16 to be described later and notifies the user. The vehicle communication unit 5 is, for example, a wireless communication unit corresponding to 4G or 5G, and enables communication between the electronic control device 1 and a server 1000.

The electronic control device 1 is, for example, an electronic control unit (ECU) incorporating a storage unit 4. The electronic control device 1 includes, as functions thereof, a position specifying unit 11, a determination unit 12, an appropriateness calculation unit 13, a selection unit 14, a control unit 15, a notification control unit 16, and a rejection unit 17. In addition, the storage unit 4 stores a map 41, a control history 42, and a threshold 43. The storage unit 4 is a nonvolatile storage device, for example, a flash memory. The calculation functions executed by the position specifying unit 11, the determination unit 12, the appropriateness calculation unit 13, the selection unit 14, the control unit 15, the notification control unit 16, and the rejection unit 17 are implemented, for example, by a CPU (not illustrated) developing a program stored in a ROM (not illustrated) in a RAM (not illustrated) and executing the program.

The position specifying unit 11 is implemented using a satellite signal receiver (not illustrated) built in the vehicle 9 or the electronic control device 1. The position specifying unit 11 calculates the position of the host vehicle 9, that is, the latitude and longitude by analyzing signals received by the satellite signal receiver from a plurality of satellites constituting a satellite navigation system. Further, the position specifying unit 11 calculates the attitude of the vehicle 9 including at least the yaw angle. The position specifying unit 11 may use a gyro sensor (not illustrated) or an accelerometer (not illustrated).

The determination unit 12 determines a current sensor capability that is the current capability of a sensor 7. In general, a sensor has performance called a rated value, but may not be able to exhibit the performance of the rated value for various reasons. The determination unit 12 determines the current sensor capability of the sensor 7 by a method to be described later, and transmits the determination result to the selection unit 14. The appropriateness calculation unit 13 calculates an appropriateness described later with reference to the control history 42. The selection unit 14 selects one of a plurality of control conditions included in the control history 42.

The control unit 15 controls the vehicle 9 using the control condition selected by the selection unit 14. Specifically, the control unit 15 outputs an operation command to the vehicle control unit 2. The notification control unit 16 uses the notification unit 3 to give a notification to a person in the vehicle 9, that is, the user, using the control condition selected by the selection unit 14. When the control condition selected by the selection unit 14 does not satisfy a condition to be described later, the rejection unit 17 rejects the selection by the selection unit 14. In this case, the control unit 15 and the notification control unit 16 prioritize the determination of the rejection unit 17 and ignore the selection by the selection unit 14.

The map 41 is a database including detailed position information of roads and features. The map 41 includes at least information on the vicinity of the current position of the vehicle 9. The map 41 may be information of an entire area of a specific country or region, or information of a radius of 10 km around the vehicle 9 may be received from the server 1000 each time. The control history 42 is statistical information in which any vehicle has been controlled in the past. The control history 42 will be described in detail later. The threshold 43 is a predetermined threshold of a precision rate. The control history 42 and the threshold 43 may be stored in the storage unit 4 in advance or may be received from the server 1000. The control history 42 may include a history in the entire area of a specific country or region, or may receive information of a radius of 10 km around the vehicle 9 from the server 1000 each time.

(Control History)

The control history 42 is statistical information in which one or more vehicles are controlled in the past. The "one or more vehicles" may or may not include the host vehicle 9. In the control history 42, the number of measurement times of the control condition of each vehicle is recorded for each point.

Figure 2:
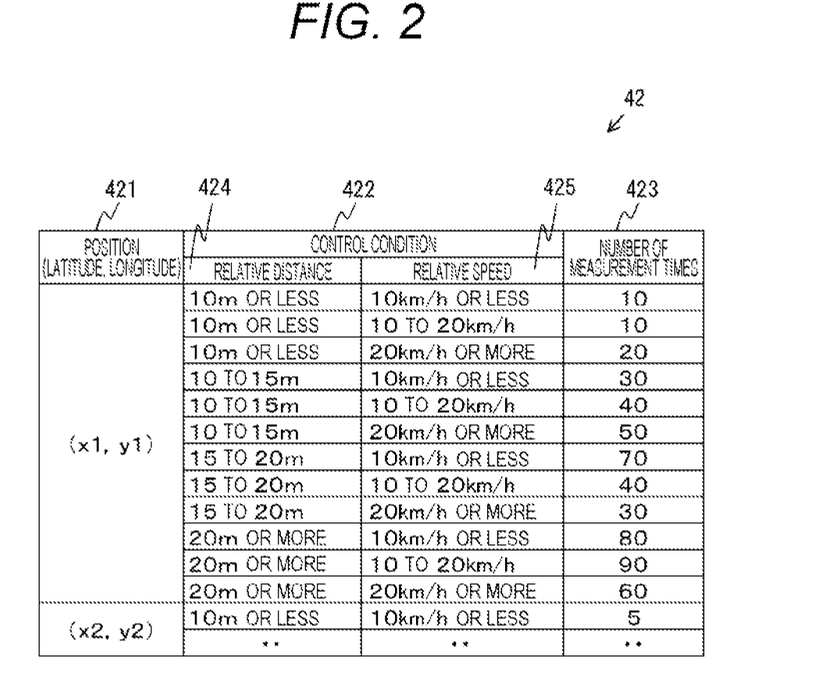
FIG. 2 is a diagram illustrating an example of a control history 42.

FIG. 2 is a diagram illustrating an example of the control history 42. The control history 42 includes a plurality of records, and each record includes fields of a position 421, a control condition 422, and a number of measurement times 423. The field of the control condition 422 includes a relative distance 424 and a relative speed 425. Note that, in the example illustrated in FIG. 2, statistical information of control conditions of the vehicle at the merging point is illustrated. In addition, the control condition is also referred to as a "vehicle control condition".

The field of the position 421 stores a combination of latitude and longitude at which the vehicle is controlled by the condition described in the control condition 422. The field of the relative distance 424 stores a relative distance between the host vehicle and another vehicle traveling in the lane to which the host vehicle merges. The field of the relative speed 425 stores a relative speed with respect to another vehicle traveling in the lane of the merging destination. The field of the number of measurement times 423 stores the number of times of the same position and the same control condition counted by the server 1000. Note that the number of measurement times is also referred to as "actual number". The first record in FIG. 2 indicates that, at a point of latitude X1 and longitude Y1, 10 times of merging under the condition of a relative distance of 10 m or less and a relative speed of 10 km/h or less.

(Appropriateness Calculation Unit)

The appropriateness calculation unit 13 calculates an appropriateness that is the number of measurement times of the vehicle control condition selected by the selection unit 14 with respect to a sum of the numbers of measurement times of the vehicle control condition having a position within a predetermined distance from the position specified by the position specifying unit 11. For example, in the example illustrated in FIG. 2, since the total number of measurement times at the position (xl, yl) is 530, when the selection unit 14 selects the control condition in the first row of FIG. 2, the appropriateness is calculated to be 10/530, that is, about 0.019.

(Determination of Current Sensor Capability)

The determination unit 12 determines the current sensor capability of the sensor 7 as follows using the map 41, the output of the position specifying unit 11, and the output of the sensor 7. First, the determination unit 12 specifies the position and the attitude of the vehicle 9 using the position specifying unit 11. Next, the determination unit 12 refers to the map 41 and reads information on a feature existing in the measurement direction of the sensor 7, for example, in front of the sensor 7 at the current position and attitude of the vehicle 9. Then, the determination unit 12 compares the output of the sensor 7 with the information of the feature read from the map 41, and when the output and the information coincide with each other, the determination unit determines that the sensor 7 can perform the measurement, that is, as long as the distance is within the distance to the feature, the determination unit determines that the sensor 7 has the capability to perform the detection. In a case where there is information that is not included in the output of the sensor 7 but is described on the map 41, the determination unit 12 determines that the sensor 7 can not perform the measurement, that is, has no capability to perform the detection up to the distance to the feature.

Figure 3:
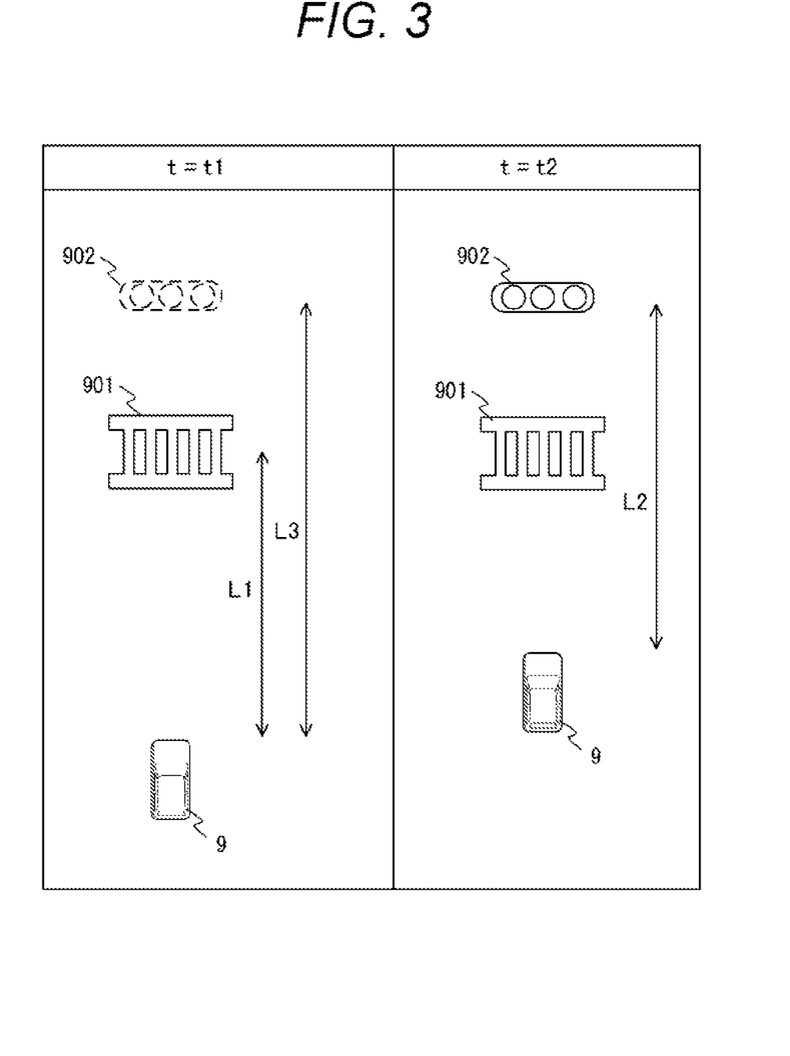
FIG. 3 is a schematic diagram for explaining determination of current sensor capability by a determination unit 12.

FIG. 3 is a schematic diagram for explaining the determination of the current sensor capability by the determination unit 12. FIG. 3 illustrates a situation around the vehicle 9 at time t1 and time t2, which is later than time t1. There are a pedestrian crossing 901 and a traffic light 902 in front of the vehicle 9. The pedestrian crossing 901 and the traffic light 902 are features included in the map 41. At time t1, a distance between the vehicle 9 and the pedestrian crossing 901 is L1, and a distance between the vehicle 9 and the traffic light 902 is L3. At time t2, the distance between the vehicle 9 and the traffic light 902 is L2.

In the situation at time t1, when the sensor 7 detects the pedestrian crossing 901 but does not detect the traffic light 902, the determination unit 12 determines that the current sensor capability of the sensor 7 is equal to or greater than the distance L1 and less than the distance L3. The determination unit 12 can further determine a detailed current sensor capability by using outputs of the sensor 7 at different times. That is, the determination unit 12 monitors the output of the sensor 7 and waits until the traffic light 902 that should be detected according to the map 41 is detected. When the vehicle 9 approaches the traffic light 902 and the sensor 7 detects the traffic light 902 for the first time at time t2, the determination unit 12 determines the current sensor capability of the sensor 7 as the distance L2.

Operation Example

It is assumed that the control history 42 is as in the example illustrated in FIG. 2 and the vehicle 9 is at a position (xl, yl). At this time, when the determination unit 12 determines that the current sensor capability of the sensor 7 is sufficiently high, for example, 30 m or more, all the control conditions illustrated in FIG. 2 can be determined. Therefore, the selection unit 14 selects the control condition of "20 m or more, 10 to 20 km/h", which is "90" having the largest number of measurement times. In a case where the determination unit 12 determines that the current sensor capability of the sensor 7 is 20 m or less, since it is impossible to determine the control conditions for setting the relative distance to 20 m or more, the selection unit 14 excludes these control conditions and then selects the control condition of "15 to 20 m, 10 km/h or less", which is "70" having the largest number of measurement times.

(Flowchart)

Figure 4:
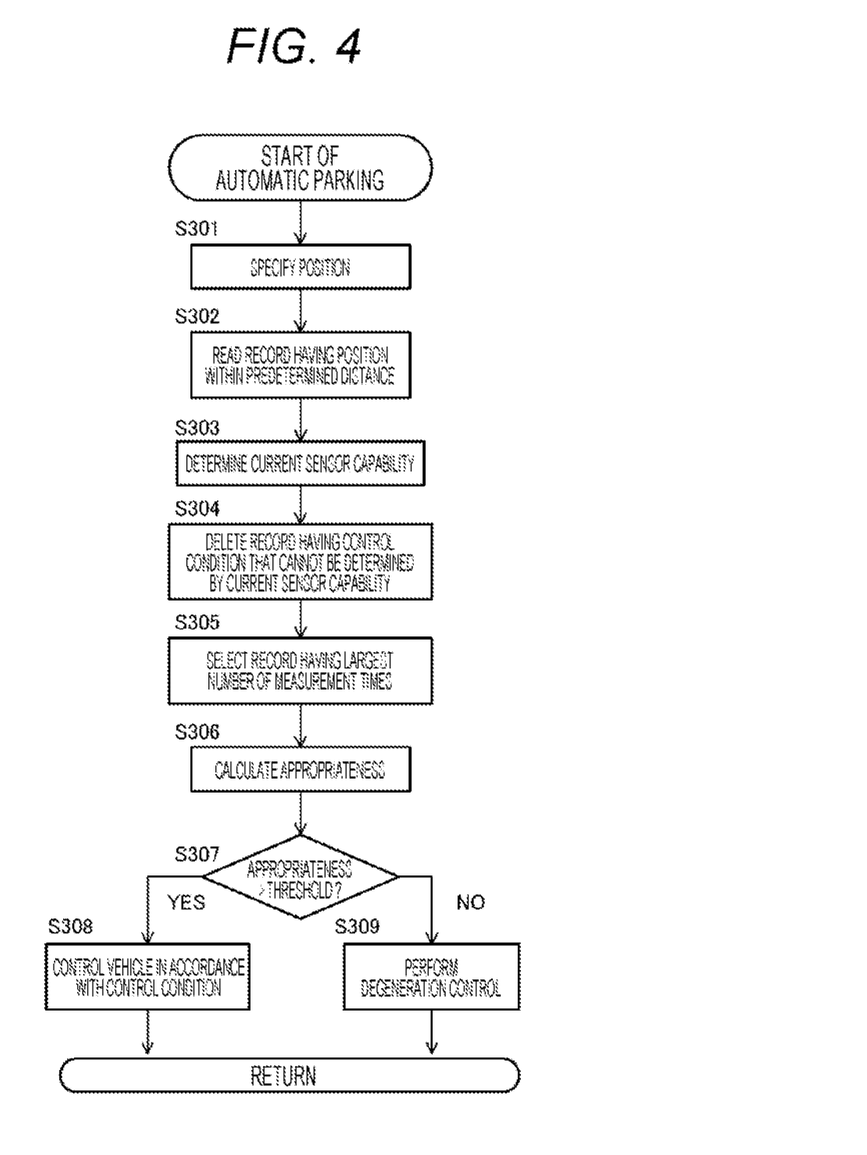
FIG. 4 is a flowchart illustrating an operation of the electronic control device 1.

FIG. 4 is a flowchart illustrating the operation of the electronic control device 1. The electronic control device 1 executes processing illustrated in FIG. 4 every predetermined time period or every time the electronic control device 1 moves by a predetermined distance. First, in step S301, the position specifying unit 11 specifies the position of the host vehicle 9. In subsequent step S302, the selection unit 14 reads a record having a position within a predetermined distance from the position specified in step S301 from the control history 42. In subsequent step S303, the determination unit 12 determines the current sensor capability of the sensor 7. However, the determination unit 12 may periodically determine the current sensor capability at an independent timing in the flowchart illustrated in FIG. 4, and in this case, in step S303, reads a result determined immediately before.

In subsequent step S304, the selection unit 14 deletes a record having a control condition that cannot be determined by the current sensor capability determined in step S303 among the records read in step S302. In subsequent step S305, the selection unit 14 selects a record having the largest number of measurement times among the records read in step S302 and not deleted in step S304. In subsequent step S306, the appropriateness calculation unit 13 calculates the appropriateness of the record selected in step S305.

In subsequent step S307, the rejection unit 17 determines whether or not the appropriateness calculated in step S306 is larger than the threshold 43. The rejection unit 17 proceeds to step S308 when determining that the calculated appropriateness is larger than the threshold 43, and proceeds to step S309 when determining that the calculated appropriateness is equal to or less than the threshold 43. In step S308, the control unit 15 controls the vehicle 9 in accordance with the control condition of the record selected in step S305, and ends the processing illustrated in FIG. 4. In step S309, the control unit 15 performs degeneration control on the vehicle 9 and ends the processing illustrated in FIG. 4.

Figure 6:
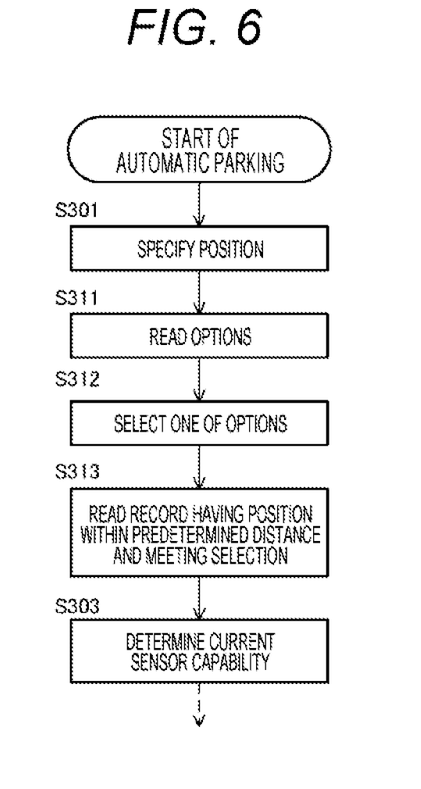
FIG. 6 is a flowchart illustrating an operation of the electronic control device 1 in Modification 4.

Note that since the processing illustrated in FIG. 4 is executed every predetermined time or every time a predetermined distance is moved, the selection of the control condition is repeatedly performed. For this reason, for example, even in a case where the processing illustrated in FIG. 4 is executed once for merging to a certain road, and a certain control condition is selected, if the current sensor capability deteriorates due to adhesion of dirt to the sensor 7 thereafter, the current sensor capability is evaluated again when the processing of FIG. 6 is executed for the second time, and a different control condition may be selected.

According to the first embodiment described above, the following operational effects can be obtained.

(1) The electronic control device 1 is mounted on the vehicle 9 having the sensor 7. The electronic control device 1 includes: the storage unit 4 that stores the control history 42 in which the vehicle control condition, which is a condition for performing an arbitrary vehicle control operation for each position, and the number of measurement times of the vehicle control condition are associated with each other; the position specifying unit 11 that specifies a position of the vehicle 9; the determination unit 12 that determines a current sensor capability that is a current capability of the sensor 7; and the selection unit 14 that selects, from the storage unit 4, the vehicle control condition having the largest number of measurement times among the vehicle control conditions that have a position within a predetermined distance from the position specified by the position specifying unit 11 and can be determined by the current sensor capability. Therefore, the control condition included in the measurable range of the sensor 7 to be used can be selected.

(2) The control unit 15 that controls the vehicle 9 on the basis of the control condition selected by the selection unit 14 is provided. Therefore, the vehicle 9 can be automatically controlled on the basis of the selection of the selection unit 14 without requiring the operation by the user.

(3) The appropriateness calculation unit 13 that calculates an appropriateness that is the number of measurement times of the vehicle control condition selected by the selection unit 14 with respect to a sum of the numbers of measurement times of the vehicle control condition having a position within a predetermined distance from the position specified by the position specifying unit 11 is provided. The storage unit 4 stores the threshold 43 of the appropriateness. The electronic control device 1 includes the rejection unit 17 that rejects selection by the selection unit 14 when the appropriateness calculated by the appropriateness calculation unit 13 is less than the threshold 43. Therefore, it is possible to avoid an odd control condition that other vehicles do not frequently perform.

(4) The storage unit 4 stores the map 41 including position information of a feature. The determination unit 12 determines the current sensor capability of the sensor 7 by collating information on the feature in the output of the sensor 7 with the map 41. Therefore, the current capability of the sensor 7 can be determined.

Modification 1

The notification control unit 16 may be operated instead of the control unit 15. Specifically, in steps S308 and S309 in FIG. 4, the notification control unit 16 may be operated as follows. In step S308, the notification control unit 16 notifies the user of the control condition of the record selected in step S305. In step S309, the notification control unit 16 notifies the user that the degeneration operation is recommended.

Furthermore, the notification control unit 16 may operate together with the control unit 15. In this case, since the user can grasp in advance how the vehicle 9 operates, a sense of security can be obtained.

According to Modification 1, the following operational effects can be obtained.

(5) The notification control unit 16 that performs notification on the basis of the control condition selected by the selection unit 14 is provided. Therefore, in a case where the control unit 15 does not operate, it functions as an advice provision to the user, and in a case where the control unit 15 operates, it functions as an operation preliminary notification.

Modification 2

In the first embodiment described above, the control history 42 has been described by taking the control condition of the vehicle at the merging point as an example. However, the control history 42 is not limited to the control condition of the merging point, and for example, various control conditions such as passing through an intersection, overtaking, and traveling on a narrow street are targeted. In addition, in passing through an intersection, straight traveling, right turning, and left turning at the intersection are treated as independent events. Further, in any event, each combination of lane numbers of a movement source and a movement destination may be treated as an independent event.

Modification 3

When controlling the vehicle 9 on the basis of the control condition selected by the selection unit 14, the control unit 15 may change the control condition depending on the type of another vehicle (hereinafter referred to as "merging destination vehicle") traveling in the lane of the merging destination. For example, when the merging destination vehicle is a two-wheeled vehicle, the relative distance and the relative speed are increased since it is assumed that the speed and position change are more severe than those of the automobile. For example, when the merging destination vehicle is a large vehicle, the relative distance is increased.

Note that, instead of the control unit 15 changing the control condition depending on the type of the merging destination vehicle, the type of the merging destination vehicle may be included in the control history 42. In this case, each of the control conditions is aggregated for each combination of the position and the type of the merging destination vehicle.

Modification 4

In the control history 42, the number of measurement times of control conditions may be recorded for each option in vehicle control. The option in the vehicle control is, for example, at merging, an option of overtaking and merging or being overtaken and merging. Further, for example, in a case where there are a plurality of traveling lanes in a right turn or a left turn at an intersection, there is an option of moving from which traveling lane to which traveling lane.

Figure 5:
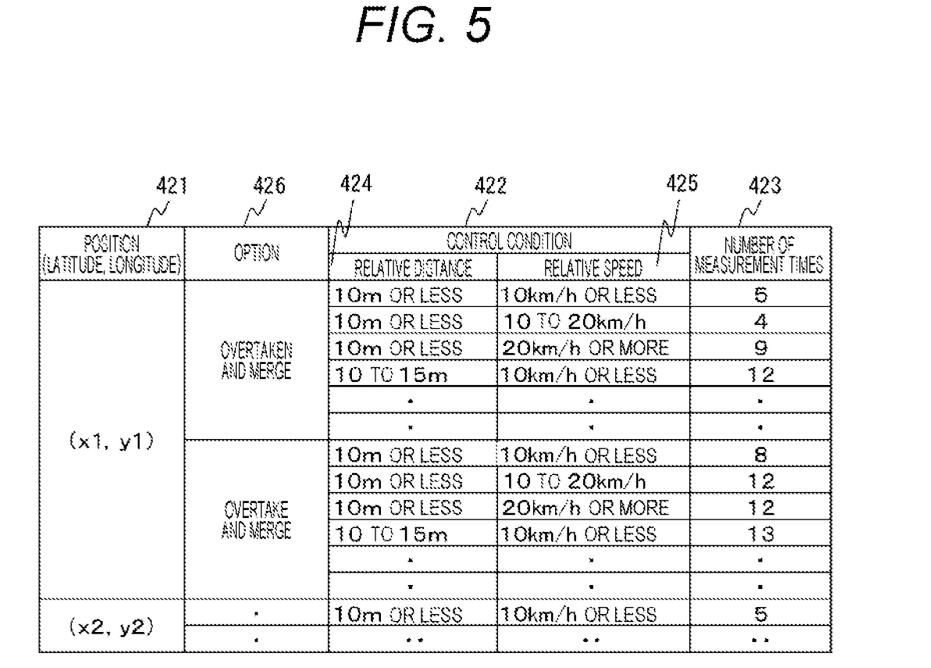
FIG. 5 is a diagram illustrating an example of a control history 42 in Modification 4.

FIG. 5 is a diagram illustrating an example of a control history 42 in Modification 4. In the example illustrated in FIG. 5, the field of the option 426 is added as compared with the example illustrated in FIG. 2. Any option in vehicle control is stored in the field of option 426. The control condition 422 and the number of measurement times 423 are recorded for each option 426.

FIG. 6 is a flowchart illustrating the operation of the electronic control device 1 in Modification 4. In FIG. 6, compared with FIG. 4, steps S311 to S313 are executed instead of step S302. Since processing in step S303 and thereafter is similar to that in FIG. 4, illustration of step S304 and thereafter is omitted in FIG. 6.

In step S301, the position specifying unit 11 specifies the position of the host vehicle 9. In subsequent step S311, the selection unit 14 reads options at the position specified in step S301 from the control history 42. In subsequent step S312, the control unit 15 selects one of the read options. For example, the control unit 15 may determine which option is preferable with reference to the output of the sensor 7, or may randomly select any option. Note that, a preferable option can be determined from various viewpoints such as safety, ride comfort, energy consumption, and noise. These viewpoints may be determined in advance or may be configured to allow the user to specify.

In subsequent step S313, the selection unit 14 reads a record having a position within a predetermined distance from the position specified in step S301 and having the option selected in step S312 from the control history 42. Since the processing in step S303 and thereafter is similar to that of the first embodiment, the description thereof will be omitted.

Modification 5

A field indicating weather or a state of a road may be added to the control history 42. The weather and the state of the road are, for example, clear weather, rain, snow, freezing, and the like.

Modification 6

In step S309 of FIG. 4, the control unit 15 may perform switching to manual driving instead of performing degeneration control.

Second Embodiment

A second embodiment of the electronic control device will be described with reference to FIG. 7. In the following description, the same components as those of the first embodiment are denoted by the same reference numerals, and differences will be mainly described. The points not specifically described are the same as those in the first embodiment. The present embodiment is different from the first embodiment mainly in that the number of measurement times described in the control history reflects only the traveling of the vehicle 9.

Figure 7:
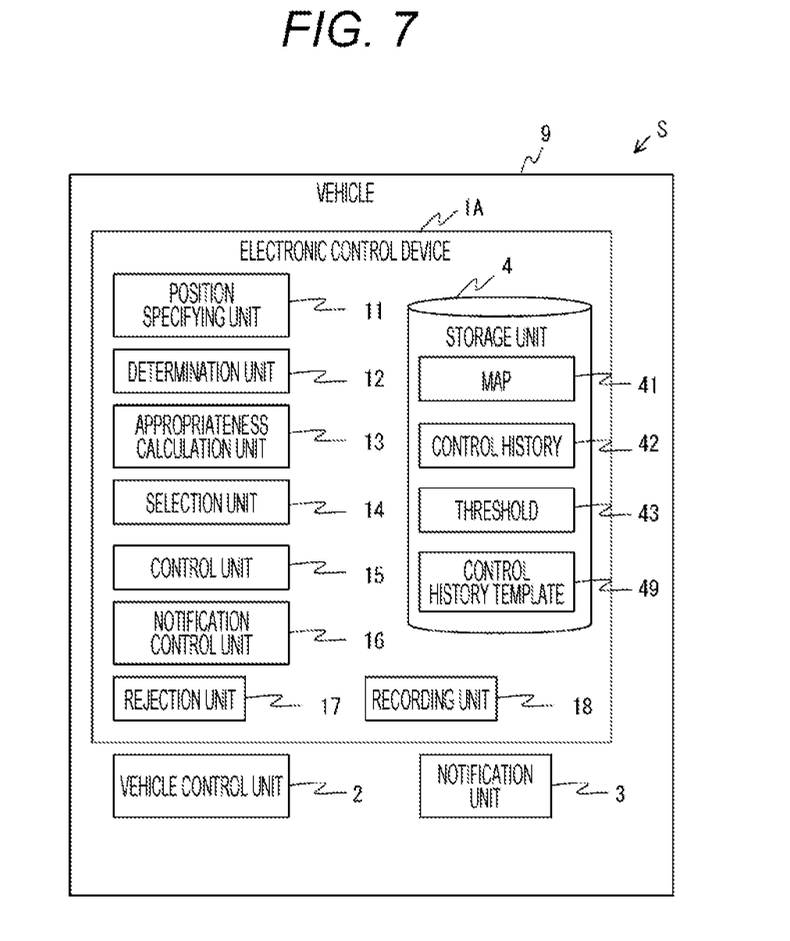
FIG. 7 is a configuration diagram of an electronic control device and a vehicle on which the electronic control device is mounted according to a second embodiment.

FIG. 7 is a configuration diagram of an electronic control device 1A in the second embodiment and a vehicle 9 on which the electronic control device 1A is mounted. The electronic control device 1A further includes a recording unit 18 in addition to the functions in the first embodiment. The electronic control device 1A does not need to include the vehicle communication unit 5. In the present embodiment, the storage unit 4 further stores a control history template 49. The control history template 49 is obtained by removing the position and the number of measurement times from the control history 42, and can also be said to be a list of classifications of control conditions. The control history template 49 is stored in advance in the storage unit 4. However, in the present embodiment, the control history 42 is created by the electronic control device 1A.

When the user is driving the vehicle 9, the recording unit 18 refers to the control history template 49 and performs writing in the control history 42 little by little. In the control history 42 in the initial state, the numbers of measurement times are all 0. Every time the user performs traveling that meets a specific control condition by manual driving, the number of executed measurement times of the control condition at the driving position is increased by "1" by the recording unit 18. As the manual driving of the vehicle 9 by the user is repeated, the number of measurement times of the control history 42 is increased by the recording unit 18.

According to the second embodiment described above, the following operational effects can be obtained.

(6) The recording unit 18 increases the number of measurement times of control history 42 on the basis of driving of the vehicle 9 by the user. Therefore, the electronic control device 1A can create the control history 42 alone without requiring communication with the server 1000.

In the above-described embodiments and modifications, the configuration of the functional block is merely an example. Some functional configurations illustrated as separate functional blocks may be integrally configured, or a configuration illustrated in one functional block diagram may be divided into two or more functions. In addition, some of the functions of each functional block may be included in another functional block.

In each of the above-described embodiments and modifications, the program is stored in the ROM (not illustrated), but the program may be stored in the storage unit 4. In addition, the electronic control device 1 may include an input/output interface (not illustrated), and a program may be read from another device via the input/output interface and a medium that can be used by the electronic control device 1 when necessary. Here, the medium refers to, for example, a storage medium detachable from the input/output interface, or a communication medium, that is, a wired, wireless, or optical network, or a carrier wave or a digital signal propagating through the network. In addition, some or all of the functions implemented by the program may be implemented by a hardware circuit or an FPGA.

The above-described embodiments and modifications may be combined. Although various embodiments and modifications have been described above, the present invention is not limited to these contents. Other embodiments conceivable within the scope of the technical idea of the present invention are also included in the scope of the present invention.

The disclosure of the following priority basic application is incorporated herein by reference.

Japanese Patent Application No. 2020-11230 (filed on Jan. 27, 2020)

REFERENCE SIGNS LIST 1, 1A electronic control device
2 vehicle control unit
3 notification unit
4 storage unit
7 sensor
9 vehicle
11 position specifying unit
12 determination unit
13 appropriateness calculation unit
14 selection unit
15 control unit
16 notification control unit
17 rejection unit
18 recording unit
41 map
42 control history
43 threshold
1000 server

The invention claimed is:

1. An electronic control device mounted on a vehicle having a sensor, the electronic control device comprising:
 a storage unit that stores a control history in which a vehicle control condition and a number of measurement times of the vehicle control condition are associated with each other, the vehicle control condition being a condition for performing an arbitrary vehicle control operation for each encountered position;
 a position specifying unit that specifies a position of the vehicle;
 a determination unit that determines a current sensor capability that is a current capability of the sensor; and
 a selection unit that selects, from the storage unit, the vehicle control condition having the largest number of measurement times among the vehicle control conditions that have a position within a predetermined distance from the position specified by the position specifying unit and that can be determined by the current sensor capability.

2. The electronic control device according to claim 1, further comprising a control unit that performs control of the vehicle on a basis of the control condition selected by the selection unit.

3. The electronic control device according to claim 1, further comprising a notification control unit that performs notification on a basis of the control condition selected by the selection unit.

4. The electronic control device according to claim 1, further comprising
 an appropriateness calculation unit that calculates an appropriateness that is a number of measurement times of the vehicle control condition selected by the selection unit with respect to a sum of the numbers of measurement times of the vehicle control condition having a position within a predetermined distance from the position specified by the position specifying unit,
 the storage unit further storing a threshold of the appropriateness, and
 the electronic control device further comprising a rejection unit that rejects selection by the selection unit when the appropriateness calculated by the appropriateness calculation unit is less than the threshold.

5. The electronic control device according to claim 1, wherein the storage unit further stores map information including position information of a feature, and the determination unit determines a current sensor capability of the sensor by collating information on the feature in the output of the sensor with the map information.

6. The electronic control device according to claim 1, further comprising a recording unit that increases the number of measurement times of the control history on a basis of driving of the vehicle by a user.

7. A selection method executed by an electronic control device mounted on a vehicle having a sensor, the electronic control device including a storage unit that stores a control history in which a vehicle control condition and a number of measurement times of the vehicle control condition are associated with each other, the vehicle control condition being a condition for performing an arbitrary vehicle control operation for each encountered position, the selection method comprising:

specifying a position of the vehicle;

determining a current sensor capability that is a current capability of the sensor; and selecting, from the storage unit, the vehicle control condition having the largest number of measurement times among the vehicle control conditions that have a position within a predetermined distance from the specified position and can be determined by the current sensor capability.

* * * * *